(12) United States Patent
Peng

(10) Patent No.: US 9,060,395 B1
(45) Date of Patent: Jun. 16, 2015

(54) LIGHT EMITTING DIODE DRIVING SYSTEM

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 14/282,443

(22) Filed: May 20, 2014

(30) Foreign Application Priority Data

Mar. 19, 2014 (TW) .............................. 103204684 U

(51) Int. Cl.
| H05B 37/02 | (2006.01) |
| H05B 39/04 | (2006.01) |
| H05B 41/36 | (2006.01) |
| H05B 41/24 | (2006.01) |
| H02J 1/00 | (2006.01) |
| H05B 33/08 | (2006.01) |

(52) U.S. Cl.
CPC ........ *H05B 33/0809* (2013.01); *H05B 33/0845* (2013.01); *H05B 33/0857* (2013.01)

(58) Field of Classification Search
CPC ........ H05B 37/02; H05B 39/04; H05B 41/36; H05B 41/24; G05F 41/36
USPC .............................. 315/307, 291, 254; 363/15
See application file for complete search history.

(56) References Cited

U.S. PATENT DOCUMENTS

| 5,862,045 | A  * | 1/1999 | Halamik et al. ................. 363/97 |
| 5,920,186 | A  * | 7/1999 | Ninh et al. ..................... 323/303 |
| 6,459,919 | B1 * | 10/2002 | Lys et al. ...................... 600/407 |
| 6,528,954 | B1 * | 3/2003 | Lys et al. ...................... 315/291 |
| 6,608,453 | B2 * | 8/2003 | Morgan et al. ................. 315/312 |
| 6,717,376 | B2 * | 4/2004 | Lys et al. ...................... 315/292 |
| 7,623,028 | B2 * | 11/2009 | Kates ............................ 340/521 |
| 7,952,893 | B2 * | 5/2011 | Hiasa .......................... 363/21.01 |
| 7,961,113 | B2 * | 6/2011 | Rabiner et al. ............... 340/4.21 |
| 8,085,563 | B2 * | 12/2011 | Gaboury et al. ................ 363/89 |
| 8,436,541 | B2 * | 5/2013 | Olson .......................... 315/149 |
| 8,482,219 | B2 * | 7/2013 | Kuo et al. ...................... 315/291 |
| 8,488,338 | B2 * | 7/2013 | Yang et al. .................. 363/21.02 |
| 8,742,686 | B2 * | 6/2014 | Zampini et al. ............... 315/297 |
| 8,742,693 | B2 * | 6/2014 | Ikeda ........................... 315/307 |
| 2008/0218101 | A1 * | 9/2008 | Vaziri .......................... 315/307 |
| 2009/0051506 | A1 * | 2/2009 | Hicksted et al. .............. 340/332 |
| 2009/0143032 | A1 * | 6/2009 | Ojanen et al. ............... 455/127.1 |
| 2009/0204239 | A1 * | 8/2009 | Netzel et al. .................... 700/83 |

(Continued)

*Primary Examiner* — Douglas W Owens
*Assistant Examiner* — Wei Chan
(74) *Attorney, Agent, or Firm* — Muncy, Geissler, Olds & Lowe, P.C.

(57) ABSTRACT

A rectifier rectifies an alternating current power to obtain a direct current power. The rectifier sends the direct current power to a driving power and synchronous signal generation apparatus. The driving power and synchronous signal generation apparatus generates a driving power. The driving power and synchronous signal generation apparatus sends the driving power through a transmission line to a plurality of light emitting diode driving apparatuses to drive a plurality of light emitting diodes. The driving power and synchronous signal generation apparatus generates a synchronous signal regularly according to the direct current power. The driving power and synchronous signal generation apparatus sends the synchronous signal through the transmission line to the light emitting diode driving apparatuses. The light emitting diode driving apparatuses drive the light emitting diodes synchronously according to the synchronous signals.

10 Claims, 8 Drawing Sheets

(56) References Cited

U.S. PATENT DOCUMENTS

| | | | |
|---|---|---|---|
| 2009/0206809 A1* | 8/2009 | Koo et al. | 323/282 |
| 2009/0315409 A1* | 12/2009 | Wheeler et al. | 307/126 |
| 2010/0246219 A1* | 9/2010 | Ying et al. | 363/74 |
| 2011/0121754 A1* | 5/2011 | Shteynberg et al. | 315/294 |
| 2011/0133655 A1* | 6/2011 | Recker et al. | 315/159 |
| 2012/0086421 A1* | 4/2012 | Saint-Pierre | 323/283 |
| 2012/0112562 A1* | 5/2012 | Wu | 307/141.4 |
| 2012/0176048 A1* | 7/2012 | Li et al. | 315/186 |
| 2012/0200230 A1* | 8/2012 | Esaki et al. | 315/200 R |
| 2012/0230064 A1* | 9/2012 | Yang et al. | 363/21.15 |
| 2012/0274298 A1* | 11/2012 | Colbeck et al. | 323/282 |
| 2013/0021005 A1* | 1/2013 | Saint-Pierre | 323/205 |
| 2013/0033193 A1* | 2/2013 | Datta | 315/224 |
| 2013/0181635 A1* | 7/2013 | Ling | 315/297 |
| 2013/0207563 A1* | 8/2013 | Hamamoto et al. | 315/210 |
| 2013/0278145 A1* | 10/2013 | Lin et al. | 315/122 |
| 2014/0009086 A1* | 1/2014 | Saint-Pierre | 315/307 |

* cited by examiner

LIGHT EMITTING DIODE DRIVING SYSTEM

BACKGROUND OF THE INVENTION

1. Field of the Invention

The present invention relates to a light emitting diode driving system, and especially relates to an improved light emitting diode driving system.

2. Description of the Related Art

Nowadays, the connection types of the light emitting diode lamp string modules are separated into two types: the serial-type connection and the parallel-type connection. The light emitting diode lamp string modules are widely used for external walls of the building, decoration of trees, signboards, and scenery designing.

The related art light emitting diode lamp string modules are commonly employed to be connected in series. Also, the amount of the light emitting diode lamp string modules is determined according to the volume of the decorated objects. In addition, all of the light emitting diode lamp string modules are controlled by the same controller which initially controls the first light emitting diode lamp string module.

Although the light emitting diode lamp string modules are easily connected together, the remaining light emitting diode lamp string modules behind the abnormal light emitting diode lamp string module cannot be lighted even only one of the light emitting diode lamp string modules is abnormal. That is because the control signal cannot be sent to drive all of the remaining light emitting diode lamp string modules.

The parallel-type light emitting diode lamp string modules are connected to the controller in parallel. Accordingly, each one of the light emitting diode lamp string modules is controlled by the controller through a control line and an address line, respectively. For example, ten control lines and ten address lines need to be used when ten light emitting diode lamp string modules are employed to be connected in parallel.

The remaining light emitting diode lamp string modules can still be normally controlled when one of the light emitting diode lamp string modules is abnormal. However, the amount of the control lines and the address lines increase proportionally. Therefore, complexity and the costs of the equipment also increase when the amount of the light emitting diode lamp string modules increases.

No matter the connection type of the light emitting diode lamp string modules is the serial-type or the parallel-type, many power transmission lines and signal transmission lines need to be used to control the colors and intensities of the light emitting diode lamp string modules. Accordingly, cost down can be achieved only if the amount of the power transmission lines or the signal transmission lines can be reduced.

SUMMARY OF THE INVENTION

In order to solve the above-mentioned problems, an object of the present invention is to provide a light emitting diode driving system.

In order to achieve the object of the present invention mentioned above, the light emitting diode driving system is applied to a rectifier and a plurality of light emitting diodes. The light emitting diode driving system comprises a driving power and synchronous signal generation apparatus, a transmission line and a plurality of light emitting diode driving apparatuses. The driving power and synchronous signal generation apparatus is electrically connected to the rectifier. The transmission line is electrically connected to the driving power and synchronous signal generation apparatus. The light emitting diode driving apparatuses are electrically connected to the transmission line, the driving power and synchronous signal generation apparatus and the light emitting diodes. The light emitting diode driving apparatus comprises a power positive terminal, a voltage regulator, a power negative terminal, a signal detector, a synchronous control logic circuit and a light changing control circuit. The power positive terminal is electrically connected to the driving power and synchronous signal generation apparatus. The voltage regulator is electrically connected to the power positive terminal. The power negative terminal is electrically connected to the voltage regulator. The signal detector is electrically connected to the power positive terminal. The synchronous control logic circuit is electrically connected to the voltage regulator, the power negative terminal and the signal detector. The light changing control circuit is electrically connected to the voltage regulator, the power negative terminal and the synchronous control logic circuit. The rectifier rectifies an alternating current power to obtain a direct current power. The rectifier sends the direct current power to the driving power and synchronous signal generation apparatus. The driving power and synchronous signal generation apparatus generates a driving power. The driving power and synchronous signal generation apparatus sends the driving power through the transmission line to the light emitting diode driving apparatuses to drive the light emitting diodes. The driving power and synchronous signal generation apparatus generates a synchronous signal regularly according to the direct current power. The driving power and synchronous signal generation apparatus sends the synchronous signal through the transmission line to the light emitting diode driving apparatuses. The light emitting diode driving apparatuses drive the light emitting diodes synchronously according to the synchronous signals.

The efficiency of the present invention is to reduce the transmission lines of the light emitting diode lamp. Therefore, the cost of the light emitting diode lamp is reduced.

DETAILED DESCRIPTION OF THE INVENTION

Figure 1:
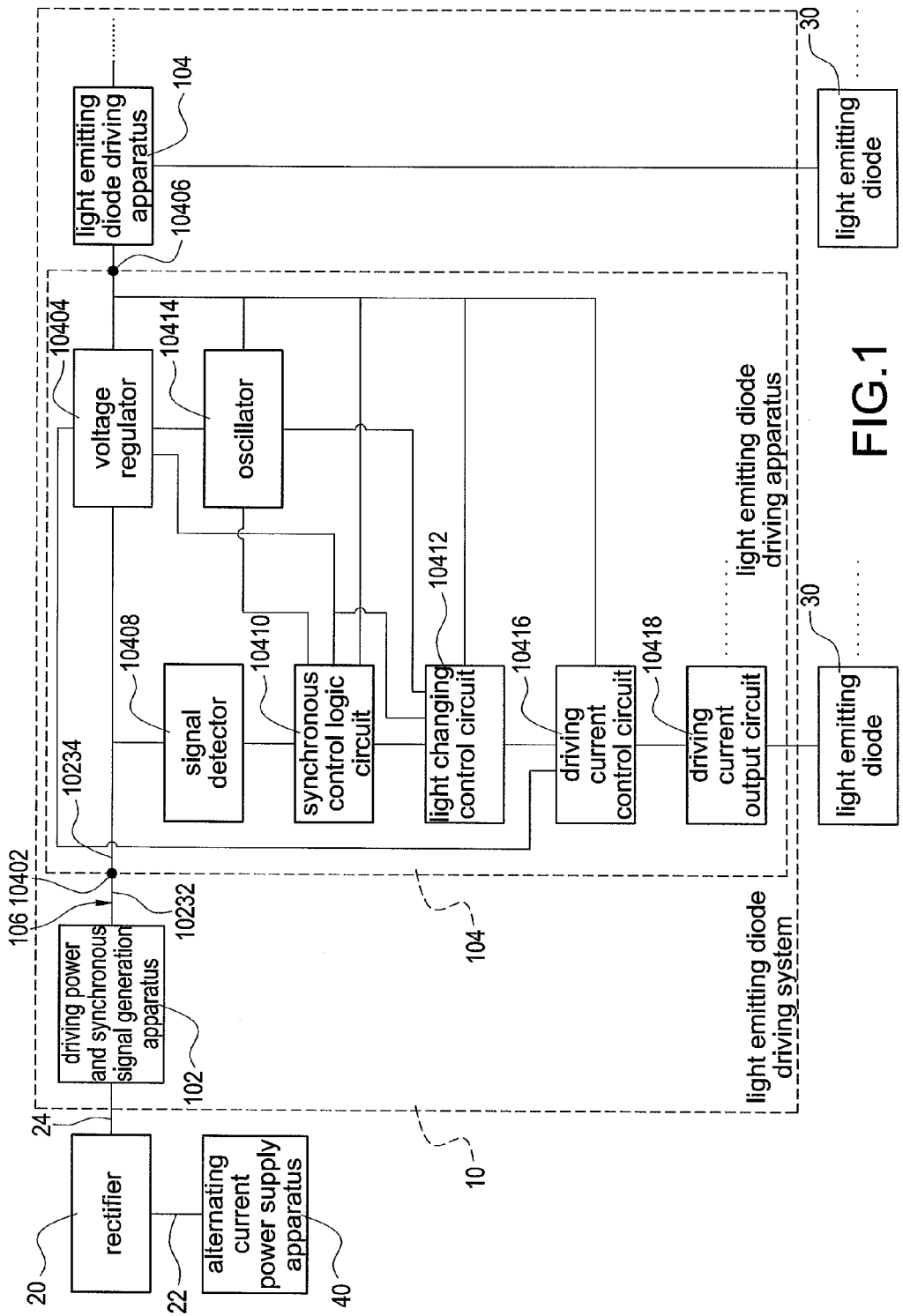
FIG. 1 shows a block diagram of the light emitting diode driving system of the present invention.

FIG. 1 shows a block diagram of the light emitting diode driving system of the present invention. A light emitting diode driving system 10 is applied to a rectifier 20 (in an alternating current condition or direct current condition) and a plurality of light emitting diodes 30. The light emitting diode driving system 10 comprises a driving power and synchronous signal generation apparatus 102, a transmission line 106 and a plurality of light emitting diode driving apparatuses 104. The rectifier 20 and the driving power and synchronous signal generation apparatus 102 are integrated as a power supply.

The driving power and synchronous signal generation apparatus 102 is electrically connected to the rectifier 20. The transmission line 106 is electrically connected to the driving power and synchronous signal generation apparatus 102. The light emitting diode driving apparatuses 104 are electrically connected to the transmission line 106, the driving power and synchronous signal generation apparatus 102 and the light emitting diodes 30.

The rectifier 20 rectifies an alternating current power 22 (sent from an alternating current power supply apparatus 40) to obtain a direct current power 24. The rectifier 20 sends the direct current power 24 to the driving power and synchronous signal generation apparatus 102. The driving power and synchronous signal generation apparatus 102 generates a driving power 10232. The driving power and synchronous signal generation apparatus 102 sends the driving power 10232 through the transmission line 106 to the light emitting diode driving apparatuses 104 to drive the light emitting diodes 30.

The driving power and synchronous signal generation apparatus 102 generates a synchronous signal 10234 regularly according to the direct current power 24. For example, the alternating current power 22 is a sinusoidal wave. The rectifier 20 is a bridge rectifier. The driving power and synchronous signal generation apparatus 102 generates the synchronous signal 10234 when the direct current power 24 is in a wave trough (i.e. the voltage value is zero). The synchronous signal 10234 is, for example but not limited to, a pulse wave. A voltage value of the pulse wave can be positive or negative.

The driving power and synchronous signal generation apparatus 102 sends the synchronous signal 10234 through the transmission line 106 to the light emitting diode driving apparatuses 104. The light emitting diode driving apparatuses 104 drive the light emitting diodes synchronously according to the synchronous signals 10234.

The transmission line 106 carries the driving power 10232 and the synchronous signal 10234 at the same time. Therefore, the transmission lines of the light emitting diode lamp are reduced and the cost of the light emitting diode lamp is reduced.

The light emitting diode driving apparatus 104 comprises a power positive terminal 10402, a voltage regulator 10404, a power negative terminal 10406, a signal detector 10408, a synchronous control logic circuit 10410, a light changing control circuit 10412, an oscillator 10414, a driving current control circuit 10416 and a plurality of driving current output circuits 10418.

The power positive terminal 10402 is electrically connected to the driving power and synchronous signal generation apparatus 102. The voltage regulator 10404 is electrically connected to the power positive terminal 10402. The power negative terminal 10406 is electrically connected to the voltage regulator 10404. The signal detector 10408 is electrically connected to the power positive terminal 10402. The synchronous control logic circuit 10410 is electrically connected to the voltage regulator 10404, the power negative terminal 10406 and the signal detector 10408. The light changing control circuit 10412 is electrically connected to the voltage regulator 10404, the power negative terminal 10406 and the synchronous control logic circuit 10410.

The oscillator 10414 is electrically connected to the voltage regulator 10404, the power negative terminal 10406, the synchronous control logic circuit 10410 and the light changing control circuit 10412. The driving current control circuit 10416 is electrically connected to the voltage regulator 10404, the power negative terminal 10406 and the light changing control circuit 10412. The driving current output circuits 10418 are electrically connected to the driving current control circuit 10416 and the light emitting diodes 30.

The signal detector 10408 detects the synchronous signal 10234 and then the signal detector 10408 informs the synchronous control logic circuit 10410. Then, the synchronous control logic circuit 10410 is configured to control and process circuit logic and then the synchronous control logic circuit 10410 informs the light changing control circuit 10412. The light changing control circuit 10412 is configured to determine the colors and intensities of the light emitting diode 30 and then the light changing control circuit 10412 informs the driving current control circuit 10416. Finally, the driving current control circuit 10416 of each of the light emitting diode driving apparatuses 104 is configured to control the driving current output circuit 10418 to drive the light emitting diodes 30 synchronously. Therefore, all of the light emitting diodes 30 are driven synchronously.

Figure 2:
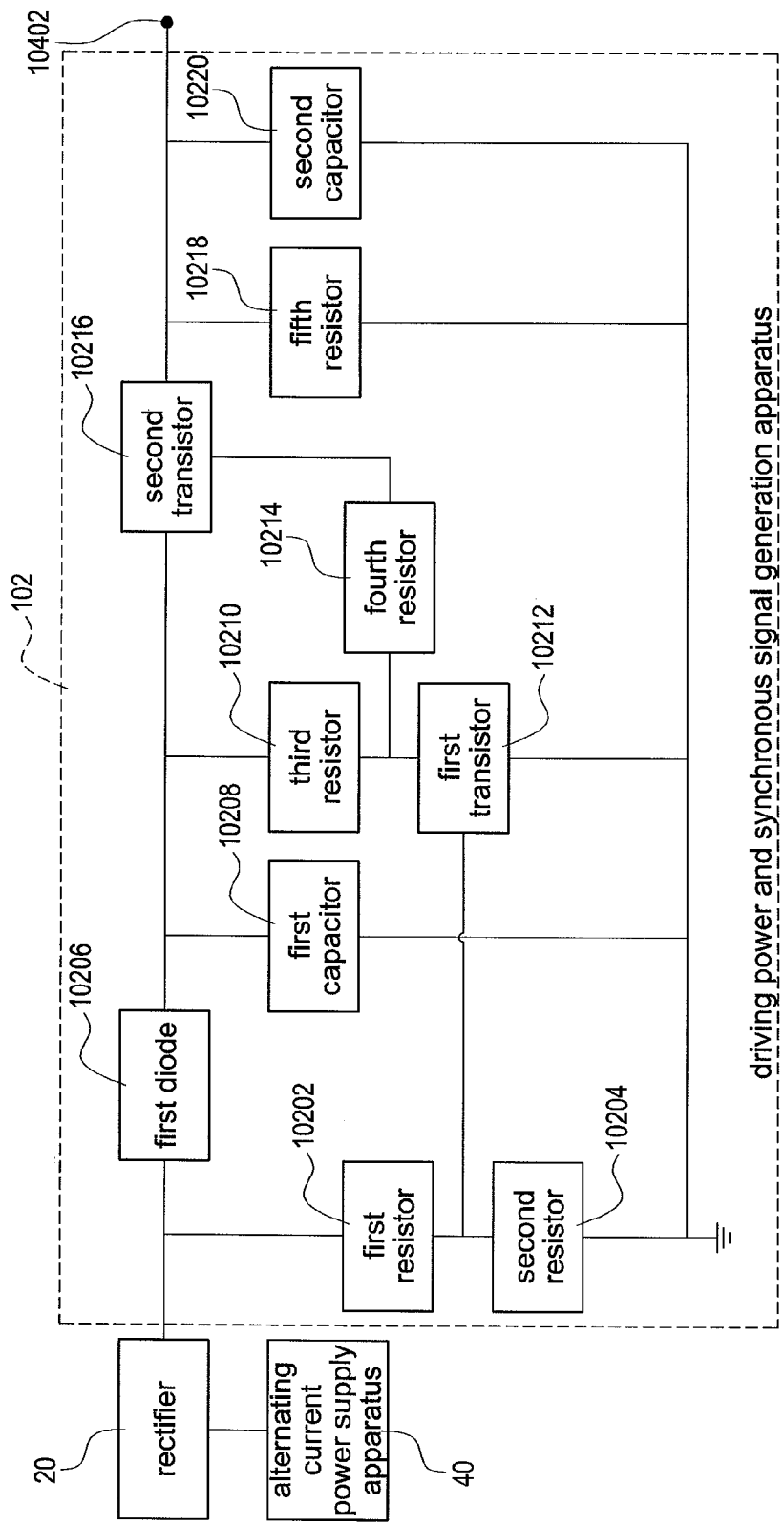
FIG. 2 shows a block diagram of the first embodiment of the driving power and synchronous signal generation apparatus of the present invention.

FIG. 2 shows a block diagram of the first embodiment of the driving power and synchronous signal generation apparatus of the present invention. The driving power and synchronous signal generation apparatus 102 comprises a first resistor 10202, a second resistor 10204, a first diode 10206, a first capacitor 10208, a third resistor 10210, a first transistor 10212, a fourth resistor 10214, a second transistor 10216, a fifth resistor 10218 and a second capacitor 10220.

The first resistor 10202 is electrically connected to the rectifier 20. The second resistor 10204 is electrically connected to the first resistor 10202. The first diode 10206 is electrically connected to the rectifier 20 and the first resistor 10202. The first capacitor 10208 is electrically connected to the first diode 10206. The third resistor 10210 is electrically connected to the first diode 10206. The first transistor 10212 is electrically connected to the first resistor 10202, the second resistor 10204 and the third resistor 10210.

The fourth resistor 10214 is electrically connected to the third resistor 10210 and the first transistor 10212. The second transistor 10216 is electrically connected to the first diode 10206 and the power positive terminal 10402. The fifth resistor 10218 is electrically connected to the power positive terminal 10402 and the second transistor 10216. The second capacitor 10220 is electrically connected to the power positive terminal 10402 and the second transistor 10216.

Figure 3:
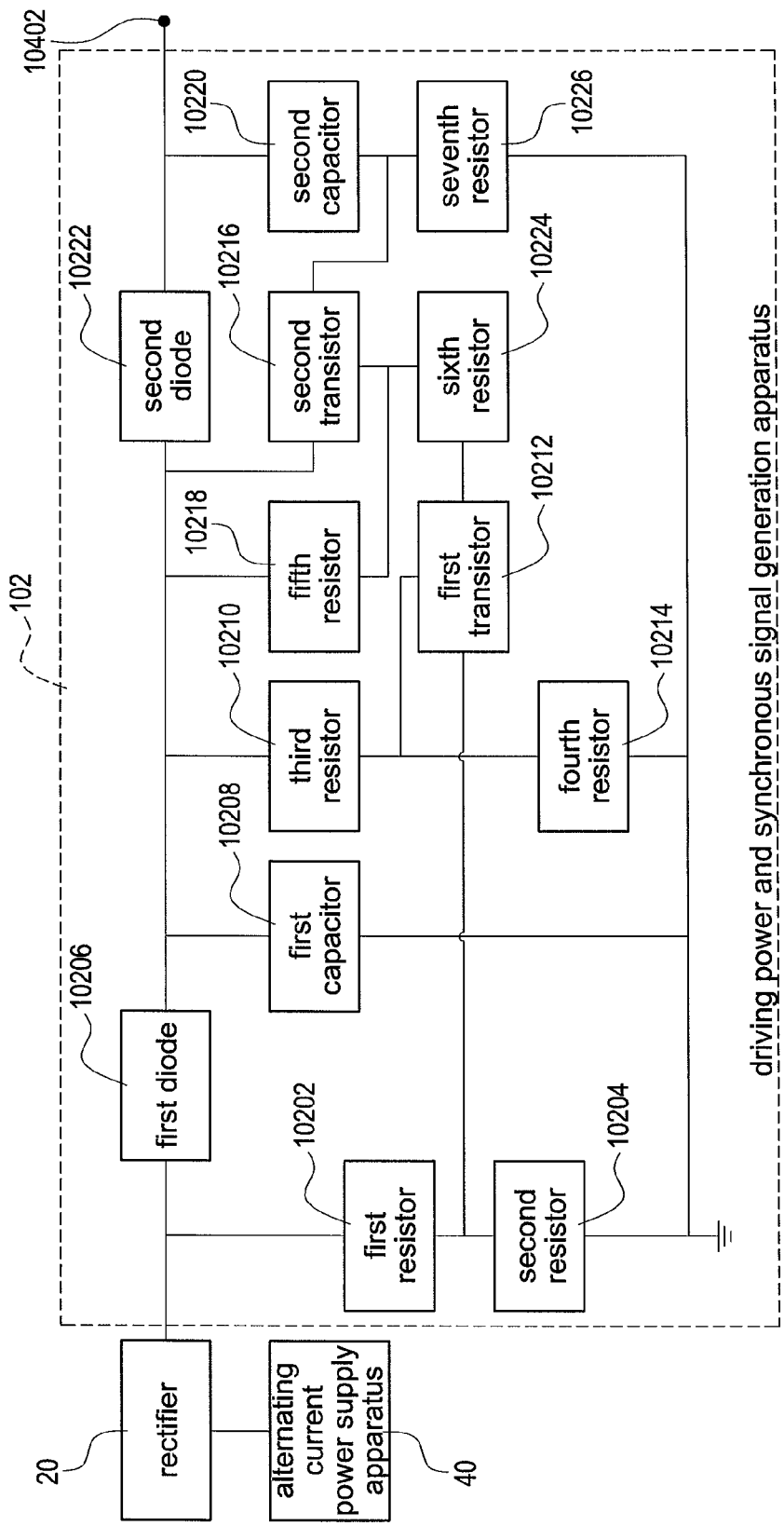
FIG. 3 shows a block diagram of the second embodiment of the driving power and synchronous signal generation apparatus of the present invention.

FIG. 3 shows a block diagram of the second embodiment of the driving power and synchronous signal generation apparatus of the present invention. The driving power and synchronous signal generation apparatus 102 comprises a first resistor 10202, a second resistor 10204, a first diode 10206, a first capacitor 10208, a third resistor 10210, a first transistor 10212, a fourth resistor 10214, a second transistor 10216, a fifth resistor 10218, a second capacitor 10220, a second diode 10222, a sixth resistor 10224 and a seventh resistor 10226.

The first resistor 10202 is electrically connected to the rectifier 20. The second resistor 10204 is electrically connected to the first resistor 10202. The first diode 10206 is electrically connected to the rectifier 20 and the first resistor 10202. The first capacitor 10208 is electrically connected to the first diode 10206. The third resistor 10210 is electrically connected to the first diode 10206. The first transistor 10212 is electrically connected to the first resistor 10202, the second resistor 10204 and the third resistor 10210.

The fourth resistor 10214 is electrically connected to the third resistor 10210. The second transistor 10216 is electrically connected to the first diode 10206. The fifth resistor 10218 is electrically connected to the first diode 10206. The second capacitor 10220 is electrically connected to the power positive terminal 10402. The second diode 10222 is electrically connected to the power positive terminal 10402, the second capacitor 10220 and the first diode 10206. The sixth resistor 10224 is electrically connected to the fifth resistor 10218, the first transistor 10212 and the second transistor 10216. The seventh resistor 10226 is electrically connected to the second transistor 10216 and the second capacitor 10220.

Figure 4:
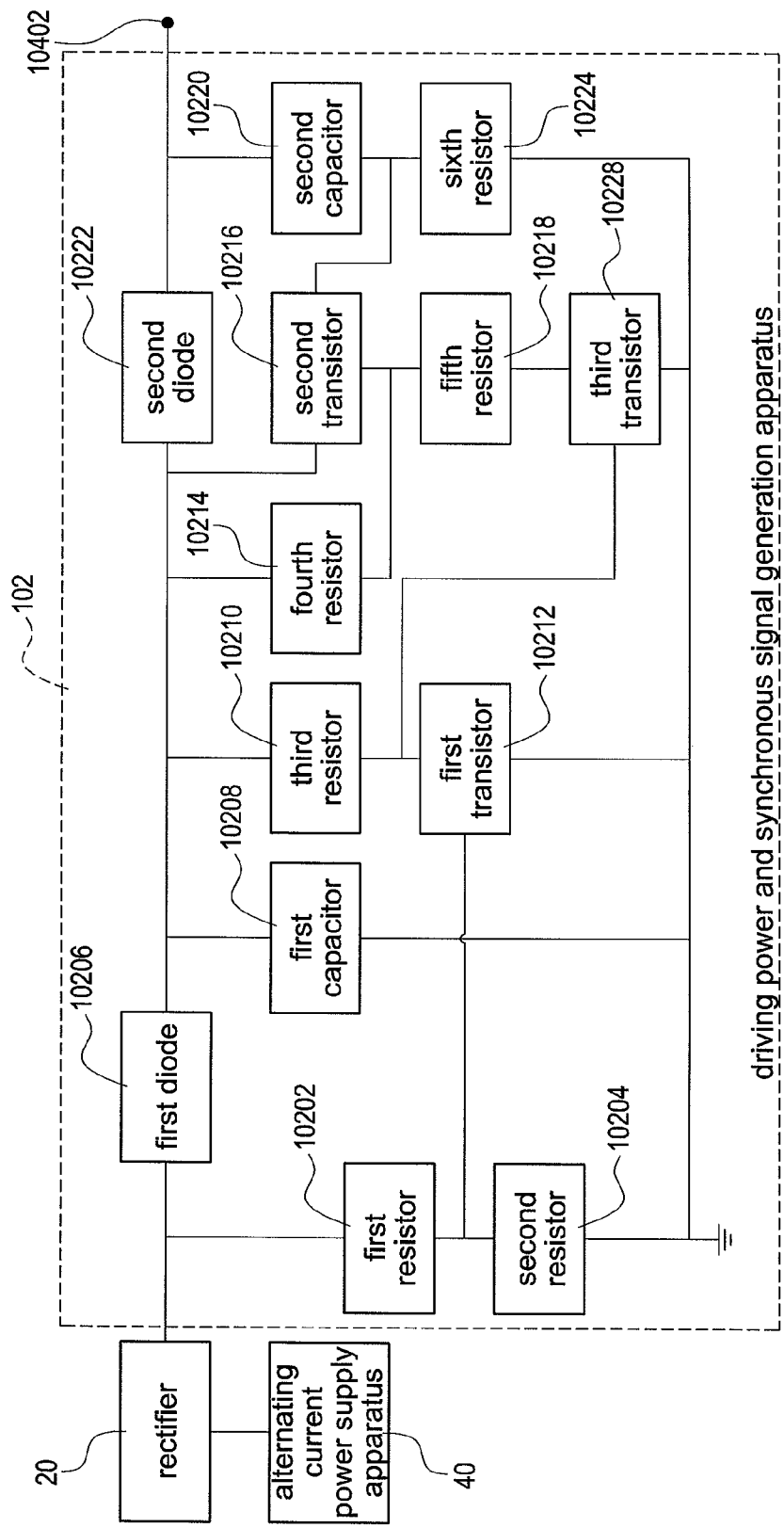
FIG. 4 shows a block diagram of the third embodiment of the driving power and synchronous signal generation apparatus of the present invention.

FIG. 4 shows a block diagram of the third embodiment of the driving power and synchronous signal generation apparatus of the present invention. The driving power and synchronous signal generation apparatus 102 comprises a first resistor 10202, a second resistor 10204, a first diode 10206, a first capacitor 10208, a third resistor 10210, a first transistor 10212, a fourth resistor 10214, a second transistor 10216, a fifth resistor 10218, a second capacitor 10220, a second diode 10222, a sixth resistor 10224 and a third transistor 10228.

The first resistor 10202 is electrically connected to the rectifier 20. The second resistor 10204 is electrically connected to the first resistor 10202. The first diode 10206 is electrically connected to the rectifier 20 and the first resistor 10202. The first capacitor 10208 is electrically connected to the first diode 10206. The third resistor 10210 is electrically connected to the first diode 10206. The first transistor 10212 is electrically connected to the first resistor 10202, the second resistor 10204 and the third resistor 10210.

The fourth resistor 10214 is electrically connected to the first diode 10206. The second transistor 10216 is electrically connected to the first diode 10206. The fifth resistor 10218 is electrically connected to the fourth resistor 10214 and the second transistor 10216. The second capacitor 10220 is electrically connected to the power positive terminal 10402. The second diode 10222 is electrically connected to the power positive terminal 10402, the second capacitor 10220 and the first diode 10206. The sixth resistor 10224 is electrically connected to the second transistor 10216 and the second capacitor 10220. The third transistor 10228 is electrically connected to the first transistor 10212, the third resistor 10210 and the fifth resistor 10218.

Figure 5:
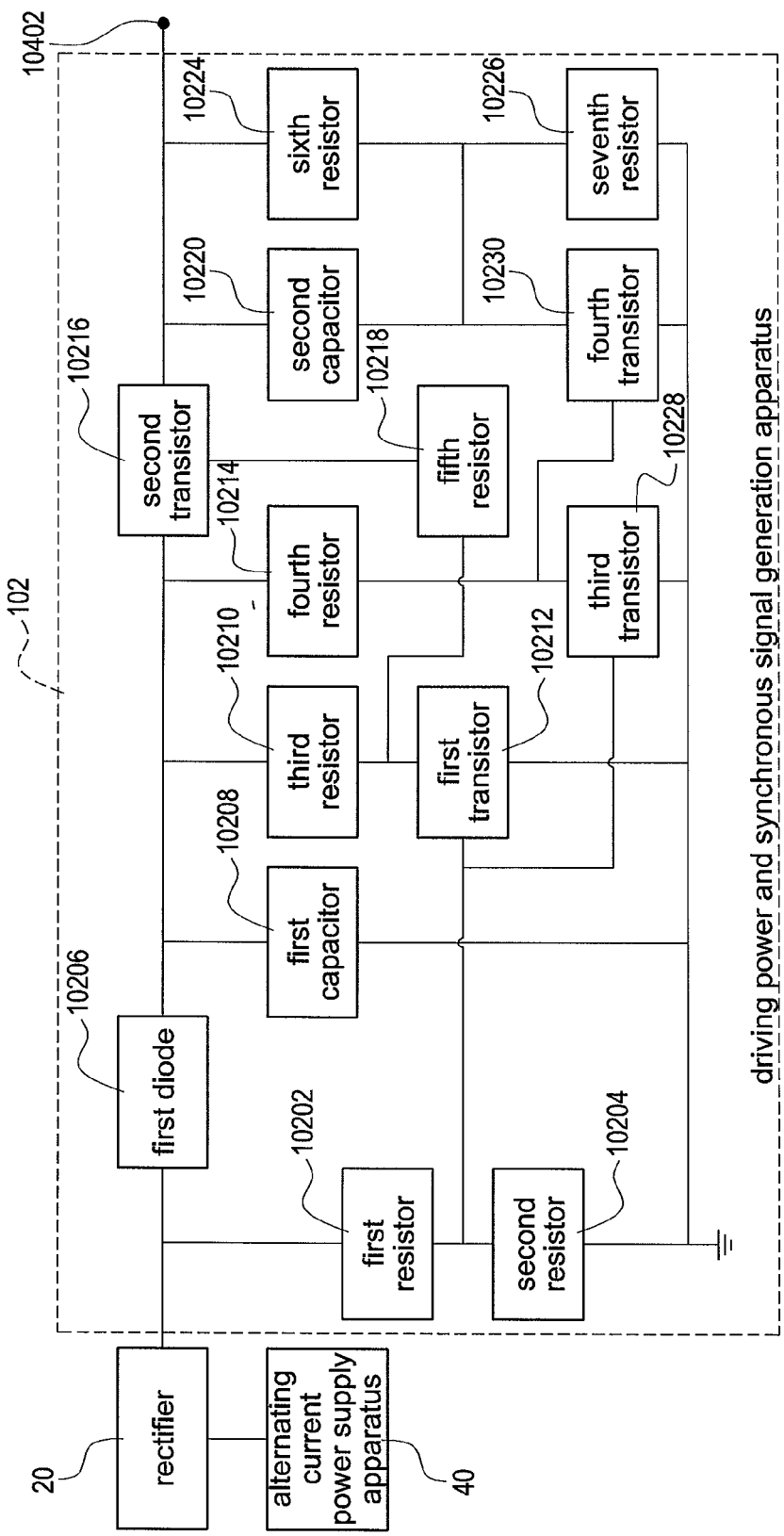
FIG. 5 shows a block diagram of the fourth embodiment of the driving power and synchronous signal generation apparatus of the present invention.

FIG. 5 shows a block diagram of the fourth embodiment of the driving power and synchronous signal generation apparatus of the present invention. The driving power and synchronous signal generation apparatus 102 comprises a first resistor 10202, a second resistor 10204, a first diode 10206, a first capacitor 10208, a third resistor 10210, a first transistor 10212, a fourth resistor 10214, a second transistor 10216, a fifth resistor 10218, a second capacitor 10220, a sixth resistor 10224, a seventh resistor 10226, a third transistor 10228 and a fourth transistor 10230.

The first resistor 10202 is electrically connected to the rectifier 20. The second resistor 10204 is electrically connected to the first resistor 10202. The first diode 10206 is electrically connected to the rectifier 20 and the first resistor 10202. The first capacitor 10208 is electrically connected to the first diode 10206. The third resistor 10210 is electrically connected to the first diode 10206. The first transistor 10212 is electrically connected to the first resistor 10202, the second resistor 10204 and the third resistor 10210.

The fourth resistor 10214 is electrically connected to the first diode 10206. The second transistor 10216 is electrically connected to the first diode 10206 and the power positive terminal 10402. The fifth resistor 10218 is electrically connected to the third resistor 10210, the first transistor 10212 and the second transistor 10216. The second capacitor 10220 is electrically connected to the power positive terminal 10402 and the second transistor 10216.

The sixth resistor 10224 is electrically connected to the power positive terminal 10402 and the second transistor 10216. The third transistor 10228 is electrically connected to the first resistor 10202, the second resistor 10204, the first transistor 10212 and the fourth resistor 10214. The seventh resistor 10226 is electrically connected to the sixth resistor 10224. The fourth transistor 10230 is electrically connected to the fourth resistor 10214, the third transistor 10228 and the second capacitor 10220.

Figure 6:
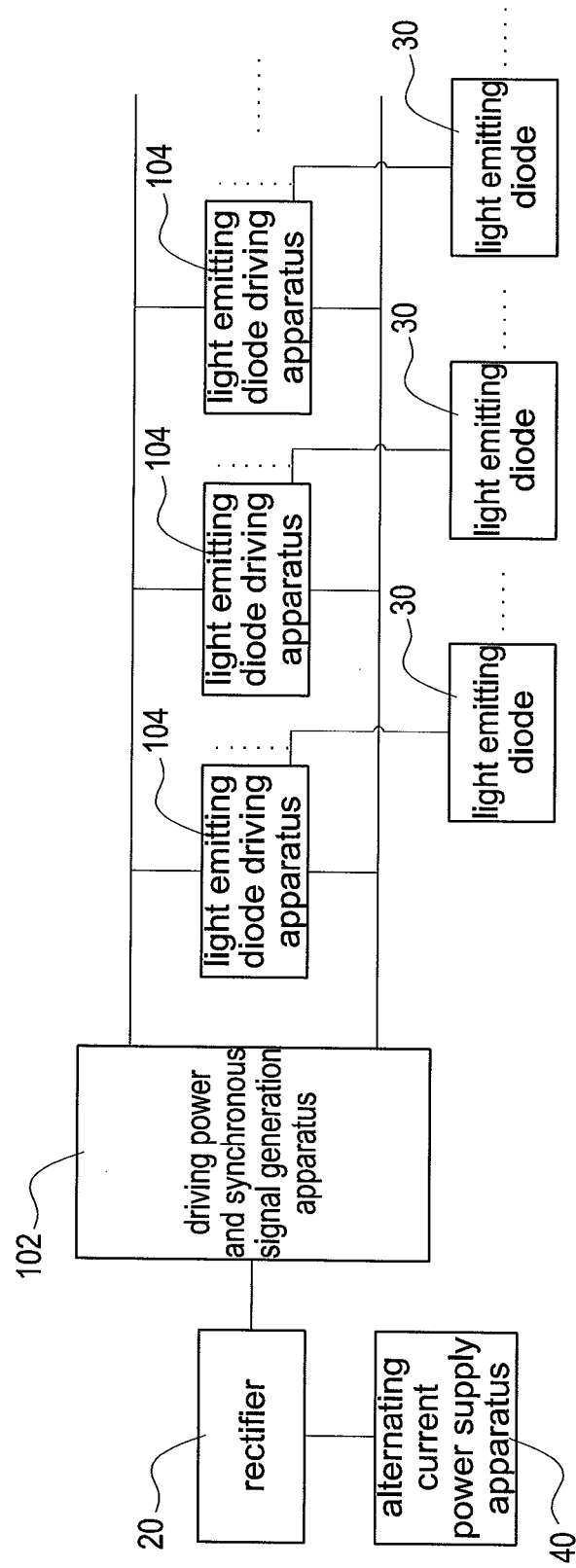
FIG. 6 shows a block diagram of an embodiment of the light emitting diode driving apparatuses in parallel.
Figure 7:
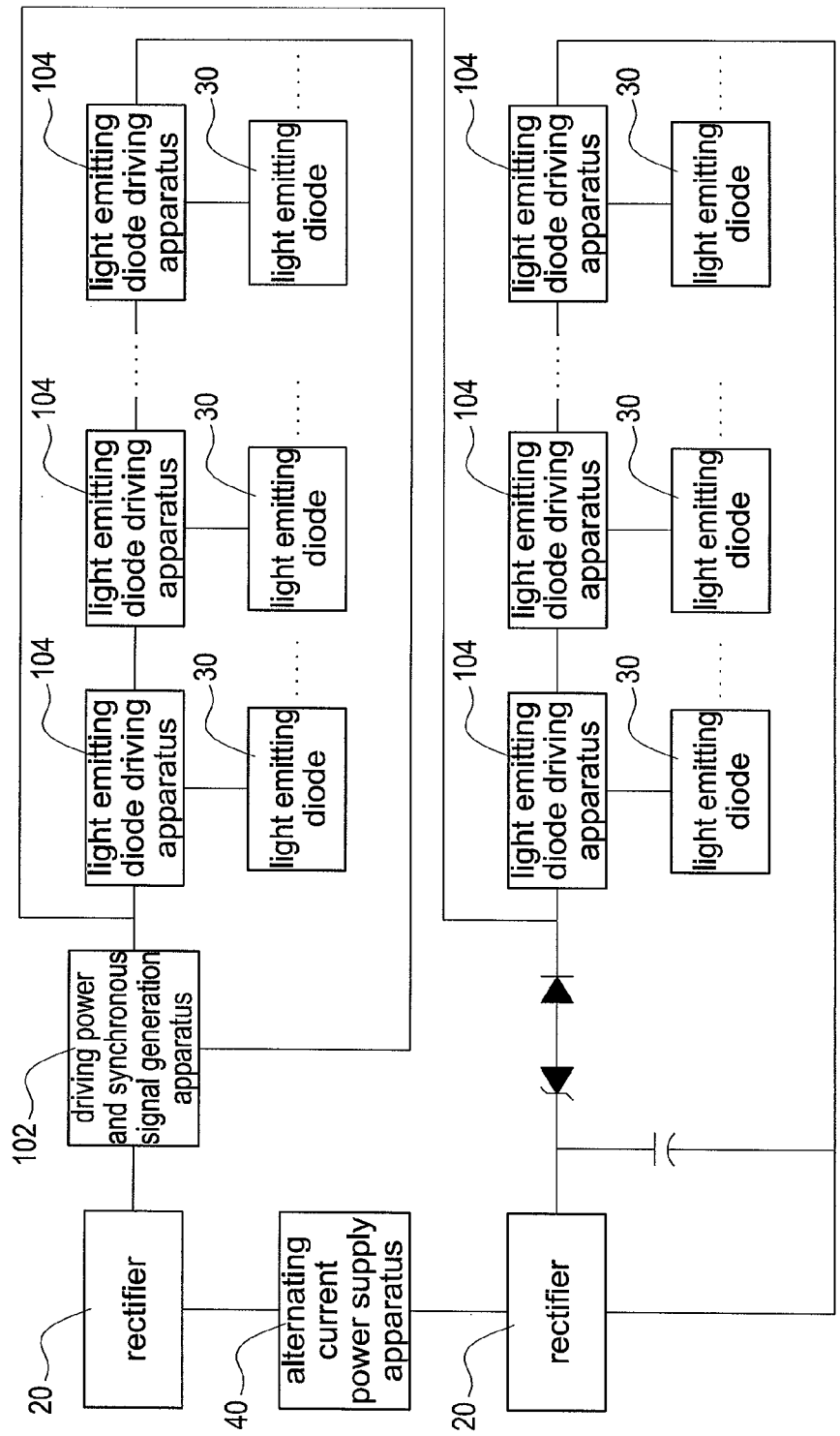
FIG. 7 shows a block diagram of an embodiment of the light emitting diode driving apparatuses in series.

FIG. 6 shows a block diagram of an embodiment of the light emitting diode driving apparatuses in parallel. FIG. 7 shows a block diagram of an embodiment of the light emitting diode driving apparatuses in series.

Figure 8:
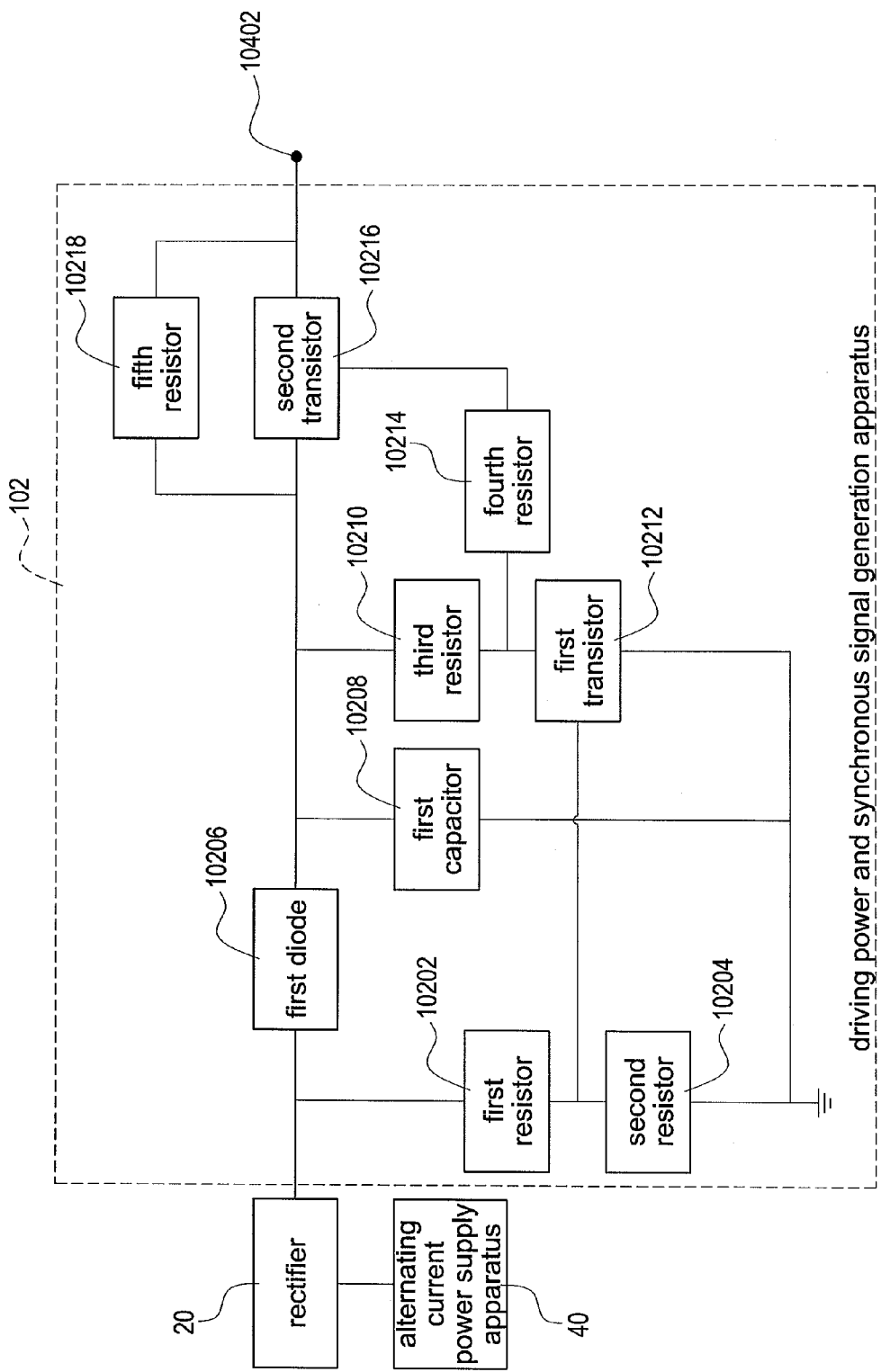
FIG. 8 shows a block diagram of the fifth embodiment of the driving power and synchronous signal generation apparatus of the present invention.

FIG. 8 shows a block diagram of the fifth embodiment of the driving power and synchronous signal generation apparatus of the present invention. The driving power and synchronous signal generation apparatus 102 comprises a first resistor 10202, a second resistor 10204, a first diode 10206, a first capacitor 10208, a third resistor 10210, a first transistor 10212, a fourth resistor 10214, a second transistor 10216 and a fifth resistor 10218.

The first resistor 10202 is electrically connected to the rectifier 20. The second resistor 10204 is electrically connected to the first resistor 10202. The first diode 10206 is electrically connected to the rectifier 20 and the first resistor 10202. The first capacitor 10208 is electrically connected to the first diode 10206. The third resistor 10210 is electrically connected to the first diode 10206. The first transistor 10212 is electrically connected to the first resistor 10202, the second resistor 10204 and the third resistor 10210.

The fourth resistor 10214 is electrically connected to the third resistor 10210 and the first transistor 10212. The second transistor 10216 is electrically connected to the first diode 10206 and the power positive terminal 10402. The fifth resistor 10218 is electrically connected to the power positive terminal 10402 and the second transistor 10216.

The advantage of the present invention is to reduce the transmission lines of the light emitting diode lamp. Therefore, the cost of the light emitting diode lamp is reduced.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode driving system applied to a rectifier and a plurality of light emitting diodes, the light emitting diode driving system comprising:
   a driving power and synchronous signal generation apparatus electrically connected to the rectifier;
   a transmission line electrically connected to the driving power and synchronous signal generation apparatus; and
   a plurality of light emitting diode driving apparatuses electrically connected to the transmission line, the driving power and synchronous signal generation apparatus and the light emitting diodes,
   wherein the light emitting diode driving apparatus comprises:

a power positive terminal electrically connected to the driving power and synchronous signal generation apparatus;

a voltage regulator electrically connected to the power positive terminal;

a power negative terminal electrically connected to the voltage regulator;

a signal detector electrically connected to the power positive terminal;

a synchronous control logic circuit electrically connected to the voltage regulator, the power negative terminal and the signal detector; and a light changing control circuit electrically connected to the voltage regulator, the power negative terminal and the synchronous control logic circuit, wherein the rectifier rectifies an alternating current power to obtain a direct current power; the rectifier sends the direct current power to the driving power and synchronous signal generation apparatus; the driving power and synchronous signal generation apparatus generates a driving power; the driving power and synchronous signal generation apparatus sends the driving power through the transmission line to the light emitting diode driving apparatuses to drive the light emitting diodes;

wherein the driving power and synchronous signal generation apparatus generates a synchronous signal regularly according to the direct current power; the driving power and synchronous signal generation apparatus sends the synchronous signal through the transmission line to the light emitting diode driving apparatuses; the light emitting diode driving apparatuses drive the light emitting diodes synchronously according to the synchronous signals.

2. The light emitting diode driving system in claim 1, wherein the light emitting diode driving apparatus further comprises:

an oscillator electrically connected to the voltage regulator, the power negative terminal, the synchronous control logic circuit and the light changing control circuit.

3. The light emitting diode driving system in claim 2, wherein the light emitting diode driving apparatus further comprises:

a driving current control circuit electrically connected to the voltage regulator, the power negative terminal and the light changing control circuit.

4. The light emitting diode driving system in claim 3, wherein the light emitting diode driving apparatus further comprises:

a plurality of driving current output circuits electrically connected to the driving current control circuit and the light emitting diodes.

5. The light emitting diode driving system in claim 4, wherein the driving power and synchronous signal generation apparatus comprises:

a first resistor electrically connected to the rectifier;
a second resistor electrically connected to the first resistor;
a first diode electrically connected to the rectifier and the first resistor;
a first capacitor electrically connected to the first diode;
a third resistor electrically connected to the first diode; and
a first transistor electrically connected to the first resistor, the second resistor and the third resistor.

6. The light emitting diode driving system in claim 5, wherein the driving power and synchronous signal generation apparatus further comprises:

a fourth resistor electrically connected to the third resistor and the first transistor;
a second transistor electrically connected to the first diode and the power positive terminal;
a fifth resistor electrically connected to the power positive terminal and the second transistor; and
a second capacitor electrically connected to the power positive terminal and the second transistor.

7. The light emitting diode driving system in claim 5, wherein the driving power and synchronous signal generation apparatus further comprises:

a fourth resistor electrically connected to the third resistor;
a second transistor electrically connected to the first diode;
a fifth resistor electrically connected to the first diode;
a second capacitor electrically connected to the power positive terminal;
a second diode electrically connected to the power positive terminal, the second capacitor and the first diode;
a sixth resistor electrically connected to the fifth resistor, the first transistor and the second transistor; and
a seventh resistor electrically connected to the second transistor and the second capacitor.

8. The light emitting diode driving system in claim 5, wherein the driving power and synchronous signal generation apparatus further comprises:

a fourth resistor electrically connected to the first diode;
a second transistor electrically connected to the first diode;
a fifth resistor electrically connected to the fourth resistor and the second transistor;
a second capacitor electrically connected to the power positive terminal;
a second diode electrically connected to the power positive terminal, the second capacitor and the first diode;
a sixth resistor electrically connected to the second transistor and the second capacitor; and
a third transistor electrically connected to the first transistor, the third resistor and the fifth resistor.

9. The light emitting diode driving system in claim 5, wherein the driving power and synchronous signal generation apparatus further comprises:

a fourth resistor electrically connected to the first diode;
a second transistor electrically connected to the first diode and the power positive terminal;
a fifth resistor electrically connected to the third resistor, the first transistor and the second transistor; and
a second capacitor electrically connected to the power positive terminal and the second transistor.

10. The light emitting diode driving system in claim 9, wherein the driving power and synchronous signal generation apparatus further comprises:

a sixth resistor electrically connected to the power positive terminal and the second transistor;
a third transistor electrically connected to the first resistor, the second resistor, the first transistor and the fourth resistor;
a seventh resistor electrically connected to the sixth resistor; and
a fourth transistor electrically connected to the fourth resistor, the third transistor and the second capacitor.

* * * * *